United States Patent
Yoon et al.

(10) Patent No.: US 11,845,698 B2
(45) Date of Patent: Dec. 19, 2023

(54) MULTILAYER CERAMIC CAPACITOR

(71) Applicant: SAMSUNG ELECTRO-MECHANICS CO., LTD., Suwon-si (KR)

(72) Inventors: Seok Hyun Yoon, Suwon-si (KR); Jung Deok Park, Suwon-si (KR); Chan Hee Nam, Suwon-si (KR); Dong Hun Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 119 days.

(21) Appl. No.: 17/697,169

(22) Filed: Mar. 17, 2022

(65) Prior Publication Data

US 2022/0220036 A1 Jul. 14, 2022

Related U.S. Application Data

(63) Continuation of application No. 16/778,693, filed on Jan. 31, 2020, now Pat. No. 11,306,031, which is a
(Continued)

(30) Foreign Application Priority Data

Sep. 29, 2017 (KR) .................. 10-2017-0128095
Oct. 16, 2017 (KR) .................. 10-2017-0133906

(51) Int. Cl.
*C04B 35/468* (2006.01)
*H01B 3/12* (2006.01)
(Continued)

(52) U.S. Cl.
CPC .......... *C04B 35/4682* (2013.01); *B32B 18/00* (2013.01); *C04B 35/49* (2013.01);
(Continued)

(58) Field of Classification Search
CPC . C04B 35/4682; C04B 35/49; C04B 2235/32; C04B 2235/3206;
(Continued)

(56) References Cited

U.S. PATENT DOCUMENTS 6,930,876 B1 8/2005 Noguchi et al.
2005/0219795 A1 10/2005 Murosawa et al.
(Continued)

FOREIGN PATENT DOCUMENTS

CN 1252782 A 5/2000
CN 1649049 A 8/2005
(Continued)

OTHER PUBLICATIONS

Office Action issued in corresponding Korean Patent Application No. 10-2017-0133906 dated Jun. 14, 2018, with English translation.
(Continued)

*Primary Examiner* — Noah S Wiese
(74) *Attorney, Agent, or Firm* — MORGAN, LEWIS & BOCKIUS LLP

(57) ABSTRACT

A multilayer ceramic capacitor includes: a ceramic body in which dielectric layers and first and second internal electrodes are alternately stacked; and first and second external electrodes formed on an outer surface of the ceramic body and electrically connected to the first and second internal electrodes, respectively. In a microstructure of the dielectric layer, dielectric grains are divided by a dielectric grain size into sections each having an interval of 50 nm, respectively, a fraction of the dielectric grains in each of the sections within a range of 50 nm to 450 nm is within a range of 0.025 to 0.20, and a thickness of the dielectric layer is 0.8 μm or less.

10 Claims, 25 Drawing Sheets

Related U.S. Application Data continuation of application No. 16/001,684, filed on Jun. 6, 2018, now Pat. No. 10,584,066.

(51) Int. Cl.
| | |
|---|---|
| *C04B 35/49* | (2006.01) |
| *H01G 4/30* | (2006.01) |
| *H01G 4/12* | (2006.01) |
| *B32B 18/00* | (2006.01) |

(52) U.S. Cl.
CPC .............. *H01B 3/12* (2013.01); *H01G 4/1218* (2013.01); *H01G 4/30* (2013.01); *C04B 2235/32* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3239* (2013.01); *C04B 2235/3241* (2013.01); *C04B 2235/3244* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/36* (2013.01); *C04B 2235/442* (2013.01); *C04B 2235/5445* (2013.01); *C04B 2235/5454* (2013.01); *C04B 2235/5463* (2013.01); *C04B 2235/6582* (2013.01); *C04B 2235/663* (2013.01); *C04B 2237/348* (2013.01); *C04B 2237/704* (2013.01)

(58) Field of Classification Search
CPC .... C04B 2235/3208; C04B 2235/3215; C04B 2235/3217; C04B 2235/3224; C04B 2235/3225; C04B 2235/3227; C04B 2235/3239; C04B 2235/3241; C04B 2235/3244; C04B 2235/3262; C04B 2235/3272; C04B 2235/3275; C04B 2235/3284; C04B 2235/3418; C04B 2235/5445; C04B 2235/5454; C04B 2235/5463; H01B 3/12; H01G 4/1218
See application file for complete search history.

(56) References Cited

U.S. PATENT DOCUMENTS

| | | | |
|---|---|---|---|
| 2006/0114641 A1* | 6/2006 | Iwasaki | C04B 35/62815 501/135 |
| 2006/0221550 A1 | 10/2006 | Ryu et al. | |
| 2007/0202036 A1 | 8/2007 | Jongen et al. | |
| 2008/0266751 A1* | 10/2008 | Yamazaki | C04B 35/62815 361/321.4 |
| 2012/0075770 A1 | 3/2012 | Banno | |
| 2014/0009864 A1 | 1/2014 | Takashima et al. | |
| 2015/0036264 A1 | 2/2015 | Morita et al. | |
| 2016/0002111 A1 | 1/2016 | Yoon et al. | |
| 2017/0186543 A1 | 6/2017 | Park et al. | |

FOREIGN PATENT DOCUMENTS

| | | |
|---|---|---|
| CN | 1677588 A | 10/2005 |
| CN | 1841588 A | 10/2006 |
| CN | 101880167 A | 11/2010 |
| CN | 104205267 A | 12/2014 |
| JP | 2012-072001 A | 4/2012 |
| KR | 10-1998-0010300 A | 10/1999 |
| KR | 10-2016-0005493 A | 4/2016 |
| KR | 10-2017-0076310 A | 7/2017 |
| WO | 98/35920 A1 | 8/1998 |
| WO | 2012/120712 A1 | 9/2012 |

OTHER PUBLICATIONS

Notice of Allowance issued in corresponding U.S. Appl. No. 16/001,684 dated Oct. 29, 2019.

Office Action issued in corresponding U.S. Appl. No. 16/001,684 dated May 31, 2019.

Office Action issued in corresponding Chinese Patent Application No. 201811071497.0 dated Apr. 21, 2020, with English translation.

Office Action issued in corresponding U.S. Appl. No. 16/778,693 dated Aug. 9, 2021.

Notice of Allowance issued in corresponding U.S. Appl. No. 16/778,693 dated Dec. 16, 2021.

* cited by examiner

MULTILAYER CERAMIC CAPACITOR

CROSS-REFERENCE TO RELATED APPLICATION(S)

This application is the continuation application of U.S. patent application Ser. No. 16/778,693 filed on Jan. 31, 2020, which is the continuation application of U.S. patent application Ser. No. 16/001,684 filed on Jun. 6, 2018, which claims the benefit of priority to Korean Patent Application Nos. 10-2017-0128095 filed on Sep. 29, 2017 and 10-2017-0133906 filed on Oct. 16, 2017 in the Korean Intellectual Property Office, the disclosures of which are incorporated herein by reference in their entirety.

BACKGROUND

1. Field

The present disclosure relates to a multilayer ceramic capacitor in which a reduction-resistant dielectric ceramic composition simultaneously having high permittivity and excellent direct current (DC)-bias characteristics is contained in a thin dielectric layer.

2. Description of Related Art

Electronic components formed using a ceramic material, such as capacitors, inductors, piezoelectric elements, varistors, thermistors, or the like, include a ceramic body formed of the ceramic material, internal electrodes formed in the ceramic body, and external electrodes mounted on a surface of the ceramic body so as to be connected to the internal electrodes.

Among ceramic electronic components, a multilayer ceramic capacitor includes a plurality of stacked dielectric layers, internal electrodes disposed to face each other with respective dielectric layers interposed therebetween, and external electrodes electrically connected to the internal electrodes.

As a high capacitance multilayer ceramic capacitor has been developed, a thickness of the dielectric layer has been reduced. In this case, a short-circuit defect as well as reliability and high-temperature withstand voltage characteristics have become important issues.

In order to solve the short-circuit defect, it is most effective to increase a surface roughness of a forming sheet using a finer $BaTiO_3$ powder.

However, since the smaller the size of a grain, the lower the permittivity, when the size of the grain is decreased by applying the fine powder, it may be difficult to implement capacitance.

Therefore, in a case of adjusting the grain to have a desired size while applying the fine $BaTiO_3$ power in order to prevent a short-circuit, a short-circuit defect in the thin dielectric layer may be prevented, and at the same time, high capacitance may be implemented.

When the size of the grain in the dielectric layer in the high-capacitance multilayer ceramic capacitor is increased as in the above-mentioned method and thus, permittivity is increased, there may be a problem in that nominal capacitance may be increased, but DC-bias characteristics may be deteriorated.

That is, at the time of applying a DC voltage, a temperature coefficient of capacitance (TCC) may be increased. Therefore, there is a need to develop a dielectric material capable of decreasing a side effect of deteriorating DC-bias characteristics as much as possible even though permittivity is increased.

Meanwhile, in order to improve DC-bias characteristics, there is a method of decreasing the size of the grain to decrease permittivity, or applying a paraelectric material.

However, in this case, since permittivity of a dielectric material is low, it may be difficult to manufacture a high-capacitance multilayer ceramic capacitor.

SUMMARY

An aspect of the present disclosure may provide a multilayer ceramic capacitor in which a reduction-resistant dielectric ceramic composition simultaneously having high permittivity and excellent direct current (DC)-bias characteristics is contained in a thin dielectric layer.

According to an aspect of the present disclosure, a multilayer ceramic capacitor may include: a ceramic body in which dielectric layers and first and second internal electrodes are alternately stacked; and first and second external electrodes formed on an outer surface of the ceramic body and electrically connected to the first and second internal electrodes, respectively. In a microstructure of the dielectric layer, dielectric grains are divided by a dielectric grain size into sections each having an interval of 50 nm, respectively, a fraction of the dielectric grains in each of the sections within a range of 50 nm to 450 nm is within a range of 0.025 to 0.20, and a thickness of the dielectric layer is 0.8 μm or less.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Figure 1:
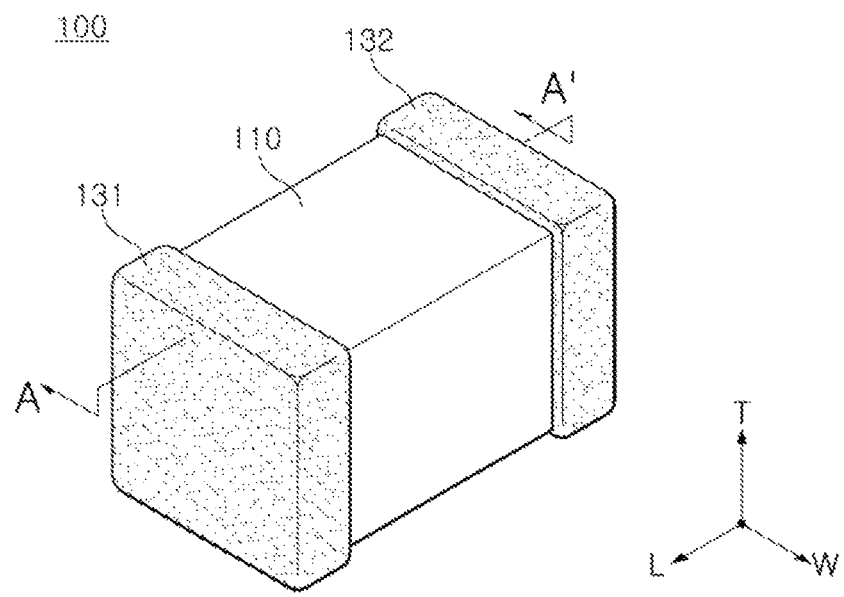
FIG. 1 is a schematic perspective view illustrating a multilayer ceramic capacitor according to an exemplary embodiment of the present disclosure.

FIG. 1 is a schematic perspective view illustrating a multilayer ceramic capacitor according to an exemplary embodiment of the present disclosure.

Figure 2:
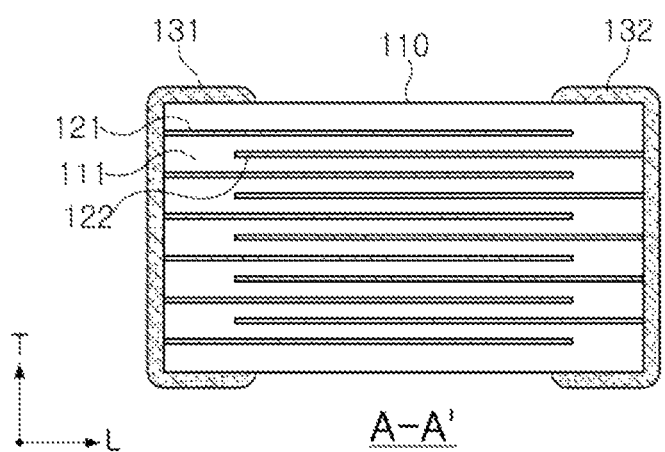
FIG. 2 is a schematic cross-sectional view illustrating the multilayer ceramic capacitor taken along line A-A' of FIG. 1.

FIG. 2 is a schematic cross-sectional view illustrating the multilayer ceramic capacitor taken along line A-A' of FIG. 1.

Referring to FIGS. 1 and 2, a multilayer ceramic capacitor 100 according to the exemplary embodiment in the present disclosure may include a ceramic body 110 in which dielectric layers 111 and first and second internal electrodes 121 and 122 are alternately stacked, and first and second external electrodes 131 and 132 formed on an outer surface of the ceramic body 110 and electrically connected to the first and second internal electrodes 121 and 122, respectively, wherein when, in a microstructure of the dielectric layer 111, dielectric grain sizes are divided into sections with an interval of 50 nm, a grain size fraction in each of the sections in a range of 50 nm to 450 nm is in a range of 0.025 to 0.20 and a thickness of the dielectric layer 111 is 0.8 μm or less.

A shape of the ceramic body 110 is not particularly limited, but generally, may be a hexahedral shape. In addition, a dimension of the ceramic body 110 is not particularly limited, and the ceramic body may have a suitable dimension depending on the use. For example, the ceramic body may have a dimension of (0.6 to 5.6 mm)×(0.3 to 5.0 mm)×(0.3 to 1.9 mm).

The thickness of the dielectric layer 111 may be 0.8 μm or less.

The first and second internal electrodes 121 and 122 may be stacked so that end surfaces thereof are exposed to first and second end portions of the ceramic body 110 opposing each other, respectively.

The first and second external electrodes 131 and 132 may be formed on the first and second end portions of the ceramic body 110 and electrically connected to the exposed end surfaces of the first and second internal electrodes 121 and 122, respectively, thereby configuring a capacitor circuit.

A conductive material contained in the first and second internal electrodes 121 and 122 is not particularly limited, but may be nickel (Ni).

A thickness of the first and second internal electrodes 121 and 122 may be appropriately determined depending on the use, or the like, but is not particularly limited. For example, the thickness of the first and second internal electrodes 121 and 122 may be 0.1 to 5 μm but may also be 0.1 μm or less.

A conductive material contained in the first and second external electrodes 131 and 132 is not particularly limited, but nickel (Ni), copper (Cu), or an alloy thereof may be used.

The dielectric layer 111 configuring the ceramic body 110 may contain a dielectric ceramic composition according to the exemplary embodiment in the present disclosure.

The dielectric layer 111 configuring the ceramic body 110 may be formed by sintering the dielectric ceramic composition according to the exemplary embodiment in the present disclosure.

In the dielectric ceramic composition contained in the dielectric layer, a base material main ingredient may be a barium titanate compound containing Ba and Ti.

The dielectric ceramic composition according to the exemplary embodiment in the present disclosure may satisfy the X5R (−55° C.~85° C.), X7R (−55° C.~125° C.), and X8R (−55° C.~150° C.) characteristics of Electronic Industries Association (EIA) standards.

According to the exemplary embodiment in the present disclosure, a dielectric ceramic composition capable of using nickel (Ni) as an internal electrode and being sintered at 1300° C. or less under a reduction atmosphere at which nickel (Ni) is not oxidized may be provided.

Further, according to the exemplary embodiment in the present disclosure, a dielectric material formed by sintering the dielectric ceramic composition and a multilayer ceramic capacitor using the dielectric ceramic composition may be provided.

In the multilayer ceramic capacitor according to the exemplary embodiment in the present disclosure, a microstructure in which grain sizes in a single dielectric layer are various may be implemented, such that the X5R or X7R characteristics of EIA standards, that is, high capacitance and relatively high effective capacitance in an environment in which DC-bias is applied, may be satisfied.

That is, according to the exemplary embodiment in the present disclosure, when in the microstructure of the dielec- tric layer 111, the dielectric grain sizes are divided into sections with the interval of 50 nm, the grain size fraction in each of the sections in the range of 50 nm to 450 nm is in a range of 0.025 to 0.20 and the thickness of the dielectric layer 111 is adjusted to be 0.8 μm or less, such that effective capacitance in the environment in which DC-bias is applied may be high, and electrical properties may be excellent.

More specifically, all the desired characteristics, that is, capability of being sintered under a reduction atmosphere at which a nickel (Ni) internal electrode may be applied, the dielectric layer having a thickness of 0.8 μm or less, high nominal permittivity, specifically, permittivity of 3300 or more, high effective permittivity, specifically, DC-bias permittivity (permittivity at the time of applying DC voltage of 2 V/μm) of 2600 or more, high-temperature (150° C.) withstand voltage of 60 V/μm or more, and temperature coefficient of capacitance (TCC) (85° C.) of less than ±15%, may be simultaneously implemented.

When in the microstructure of the dielectric layer 111, the dielectric grain sizes are divided into sections with the interval of 50 nm, the grain size in each of the sections in the range of 50 nm to 450 nm may be measured in a scanning electron microscope (SEM) image.

The grain size may be calculated by measuring lengths of respective long axes and short axes of 200 grains per one multilayer ceramic capacitor sample, but is not necessarily limited thereto.

When in the microstructure of the dielectric layer 111, the dielectric grain sizes are divided into sections with the interval of 50 nm, the grain size fraction in each of the sections in the range of 50 nm to 450 nm is in a range of 0.025 to 0.20, which means that a size fraction occupied by the grains in each of the sections distributed with the interval of 50 nm in the range of 50 nm to 540 nm in entire grain size distribution is in a range of 2.5% to 20%.

That is, this means that dielectric grains having a grain size in a range of 50 nm to 100 nm are distributed in the dielectric layer 111 in a fraction of 0.025 to 0.20 based on the entire grains, and dielectric grains having a grain size in each of the ranges of 100 nm to 150 nm, 150 nm to 200 nm, 200 nm to 250 nm, 250 nm to 300 nm, 300 nm to 350 nm, 350 nm to 400 nm, and 400 nm to 450 nm are also distributed in the dielectric layer 111 in a fraction of 0.025 to 0.20 based on the entire grains.

Further, according to the exemplary embodiment in the present disclosure, this means that a case in which when the dielectric grain sizes are divided into sections with the interval of 50 nm, grains distributed in each of the sections in the range of 50 nm to 450 nm is distributed in the dielectric layer 111 in a fraction less than 0.025 or more than 0.20 based on the entire grains is excluded.

That is, when the dielectric grain sizes are divided into sections with the interval of 50 nm, in a case in which the grains distributed in each of the sections in the range of 50 nm to 450 nm are distributed in the dielectric layer 111 in a fraction less than 0.025 or more than 0.20 based on the entire grains, the desired electrical properties may not be obtained when the thickness of the dielectric layer 111 is 0.8 μm or less.

In the multilayer ceramic capacitor according to the exemplary embodiment in the present disclosure, the dielectric ceramic composition contained in the dielectric layer may contain the base material main ingredient and the accessory ingredient, wherein the accessory ingredient may include first to sixth accessory ingredients.

Hereinafter, each of the ingredients of the dielectric ceramic composition according to the exemplary embodiment in the present disclosure will be described in detail.

a) Base Material Main Ingredient

The dielectric ceramic composition according to the exemplary embodiment in the present disclosure may contain a base material main ingredient containing Ba and Ti.

According to the exemplary embodiment in the present disclosure, the base material main ingredient may contain a main ingredient represented by $BaTiO_3$ or $(Ba_{1-x}Ca_x)(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like is partially solid-dissolved. The base material main ingredient may be contained in a powder form.

According to the exemplary embodiment in the present disclosure, in a case of applying the dielectric ceramic composition, when in the microstructure of the dielectric layer 111, the dielectric grain sizes are divided into sections with the interval of 50 nm, the grain size fraction in each of the sections in the range of 50 nm to 450 nm may be in a range of 0.025 to 0.20, and the thickness of the dielectric layer 111 may be 0.8 μm or less.

b) First Accessory Ingredient

According to the exemplary embodiment in the present disclosure, the dielectric ceramic composition may contain one or more of one or more elements selected from the group consisting of Mn, V, Cr, Fe, Ni, Co, Cu, and Zn, oxides thereof, and carbonates thereof as the first accessory ingredient.

The first accessory ingredient may be contained in a content of 0.1 to 2.0 parts by mole, based on 100 parts by mole of the base material main ingredient, in the dielectric ceramic composition.

The content of the first accessory ingredient may be based on a content of one or more elements among Mn, V, Cr, Fe, Ni, Co, Cu, and Zn contained in the first accessory ingredient, regardless of the form of addition such as that of oxide or carbonate.

For example, a sum of contents of one or more variable-valence acceptor elements among Mn, V, Cr, Fe, Ni, Co, Cu, and Zn contained in the first accessory ingredient may be 0.1 to 2.0 parts by mole, based on 100 parts by mole of the base material main ingredient.

The first accessory ingredient may serve to improve reduction resistance of the dielectric ceramic composition and high-temperature withstand voltage characteristics of a multilayer ceramic capacitor using the dielectric ceramic composition.

The content of the first accessory ingredient and contents of second to sixth accessory ingredients to be descried below, which are relative contents based on 100 parts by mole of the base material main ingredient, may be particularly defined as parts by mole of a metal or metalloid (Si) contained in a respective accessory ingredient. Parts by mole of the metal or metalloid may include parts by mole of an ionic metal or metalloid.

In a case in which the content of the first accessory ingredient is 0.1 to 2.0 parts by mole, based on 100 parts by mole of the base material main ingredient, a dielectric ceramic composition capable of having good high-temperature withstand voltage characteristics while securing a RC value may be provided.

In a case in which the content of the first accessory ingredient is less than 0.1 parts by mole, the RC value may be significantly low, or a high-temperature withstand voltage may be decreased.

In a case in which the content of the first accessory ingredient is more than 2.0 parts by mole, the RC value may be decreased.

The dielectric ceramic composition according to the exemplary embodiment in the present disclosure may contain 0.1 to 2.0 parts by mole of the first accessory ingredient, based on 100 parts by mole of the base material powder, and accordingly, the dielectric ceramic composition may be sintered at a low temperature and obtain excellent high-temperature withstand voltage characteristics.

c) Second Accessory Ingredient

According to the exemplary embodiment in the present disclosure, the dielectric ceramic composition may contain one or more of oxides and carbonates of fixed-valence acceptor elements including Mg as the second accessory ingredient.

The second accessory ingredient may be contained in a content of 2.0 parts by mole or less, based on 100 parts by mole of the base material main ingredient.

The content of the second accessory ingredient may be based on a content of Mg contained in the second accessory ingredient, regardless of the form of addition such as that of oxide or carbonate.

For example, the content of Mg contained in the second accessory ingredient may be 2.0 parts by mole or less, based on 100 parts by mole of the base material main ingredient.

In a case in which the content of the second accessory ingredient is more than 2.0 parts by mole, based on 100 parts by mole of the base material main ingredient, permittivity may be decreased, and high-temperature withstand voltage characteristics may be deteriorated.

d) Third Accessory Ingredient

According to the exemplary embodiment in the present disclosure, the dielectric ceramic composition may contain a third accessory ingredient containing one or more selected from the group consisting of oxides and carbonates of one or more elements among Y, Dy, Ho, Sm, Gd, Er, La, Ce, Tb, Tm, Yb, and Nd.

The third accessory ingredient may be contained in a content of 4.0 parts by mole or less, based on 100 parts by mole of the base material main ingredient.

The content of the third accessory ingredient may be based on a content of one or more elements among Y, Dy, Ho, Sm, Gd, Er, La, Ce, Tb, Tm, Yb, and Nd contained in the third accessory ingredient, regardless of the form of addition such as that of oxide or carbonate.

For example, a sum of contents of one or more elements among Y, Dy, Ho, Sm, Gd, Er, La, Ce, Tb, Tm, Yb, and Nd contained in the third accessory ingredient may be 4.0 parts by mole or less, based on 100 parts by mole of the base material main ingredient.

According to the exemplary embodiment in the present disclosure, the third accessory ingredient may serve to prevent reliability of the multilayer ceramic capacitor using the dielectric ceramic composition from being deteriorated.

When the content of the third accessory ingredient is more than 4.0 parts by mole, based on 100 parts by mole of the base material main ingredient, high-temperature withstand voltage characteristics may be deteriorated due to formation of a pyrochlore ($RE_2Ti_2O_7$) (Here, RE is at least one element among Y, Dy, Ho, Sm, Gd, Er, La, Ce, and Nd) secondary phase.

e) Fourth Accessory Ingredient

According to the exemplary embodiment in the present disclosure, the dielectric ceramic composition may contain the fourth accessory ingredient containing one or more selected from the group consisting of oxides and carbonates of Ba.

The fourth accessory ingredient may be contained in a content of 4.0 parts by mole or less, based on 100 parts by mole of the base material main ingredient.

The content of the fourth accessory ingredient may be based on a content of Ba contained in the fourth accessory ingredient, regardless of the form of addition such as that of oxide or carbonate.

For example, the content of Ba contained in the fourth accessory ingredient may be 4.0 parts by mole or less, based on 100 parts by mole of the base material main ingredient.

In a case in which the fourth accessory ingredient is contained in a content of 4.0 parts by mole, based on 100 parts by mole of the base material main ingredient, the high-temperature withstand voltage characteristics may be improved.

f) Fifth Accessory Ingredient

According to the exemplary embodiment in the present disclosure, the dielectric ceramic composition may contain a fifth accessory ingredient containing $CaZrO_3$.

$CaZrO_3$ may be contained in a content (based on Ca and Zr) of 10 parts by mole or less, based on 100 parts by mole of the base material main ingredient.

In a case in which the content (based on Ca and Zr) of the fifth accessory ingredient ($CaZrO_3$) is more than 10 parts by mole, based on 100 parts by mole of the base material main ingredient, the dielectric ceramic composition may not satisfy TCC standard at a low temperature (−55° C.), which is not preferable.

g) Sixth Accessory Ingredient

According to the exemplary embodiment in the present disclosure, the dielectric ceramic composition may contain a sixth accessory ingredient containing one or more selected from the group consisting of oxides of Si or Al, carbonates of Si or Al, and glass containing Si.

The sixth accessory ingredient may be contained in a content of 4.0 parts by mole or less, based on 100 parts by mole of the base material main ingredient.

The content of the sixth accessory ingredient may be based on a content of Si or Al contained in the sixth accessory ingredient, regardless of the form of addition such as that of glass, oxide, or carbonate.

In a case in which the content of the sixth accessory ingredient is more than 4.0 parts by mole, based on 100 parts by mole of the base material main ingredient, problems such as deterioration of a sintering property and density, a secondary phase formation, and the like, may occur, which is not preferable.

Hereinafter, the present disclosure will be described in detail through Experimental Examples, but the Experimental Examples are to help the specific understanding of the present disclosure. Therefore, the scope of the present disclosure is not limited thereto.

Figure 3A:
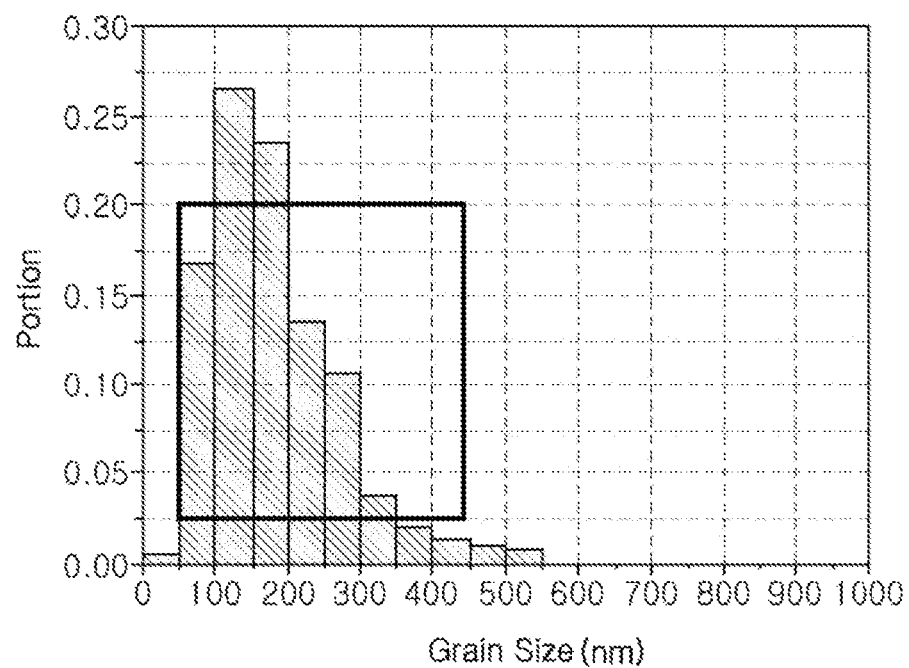
FIGS. 3A through 3X are graphs illustrating dielectric grain size distribution according to Inventive Examples and Comparative Examples.
Figure 3B:
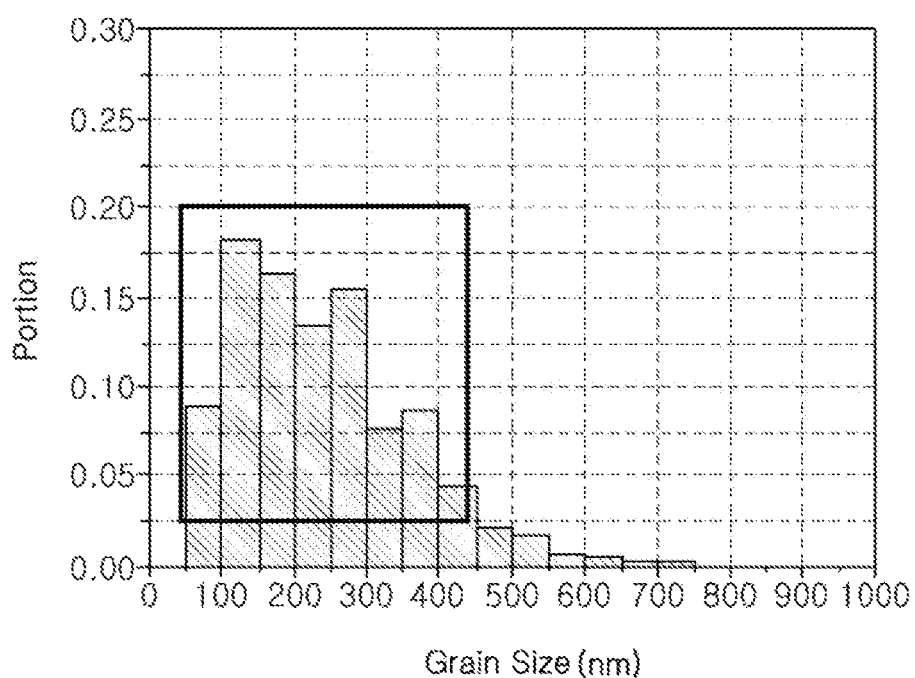
Figure 3C:
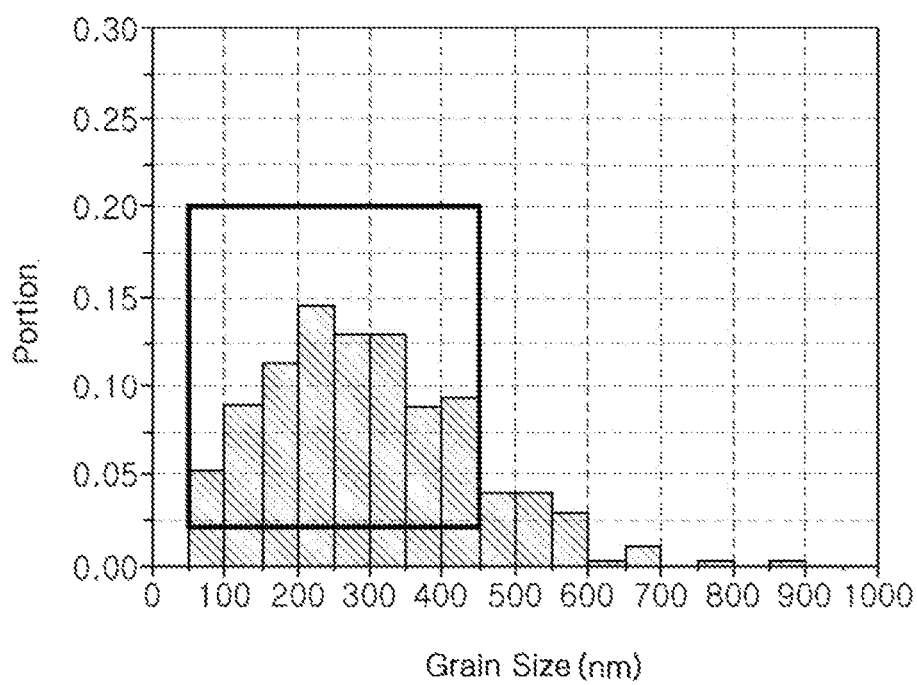
Figure 3D:
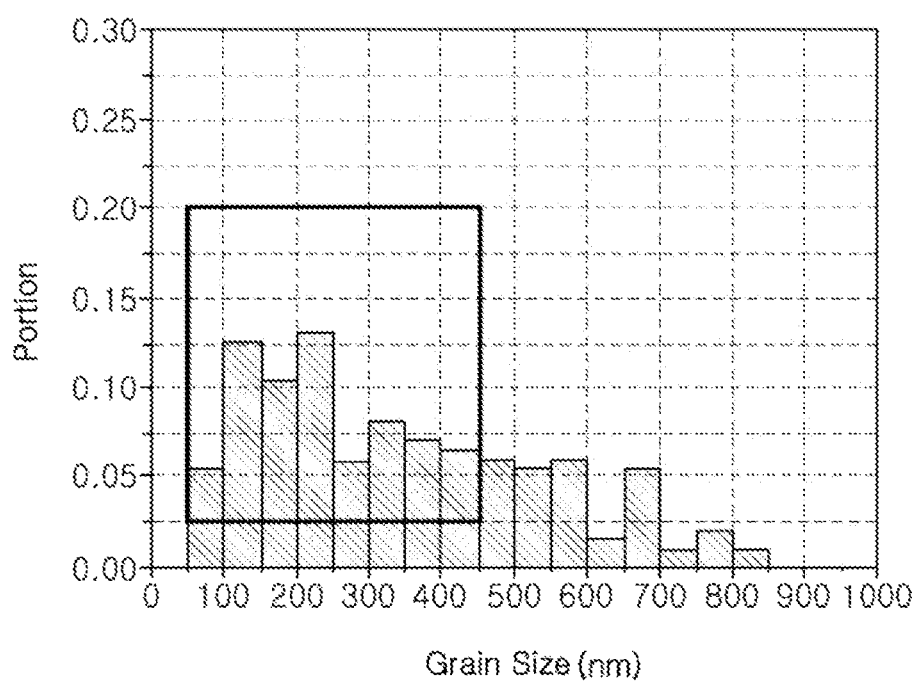
Figure 3E:
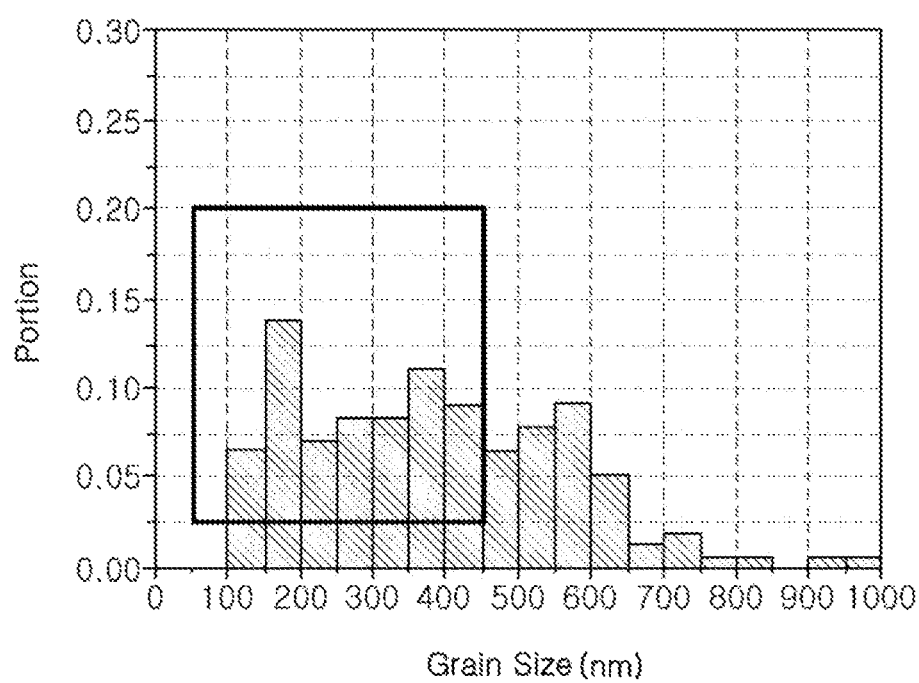
Figure 3F:
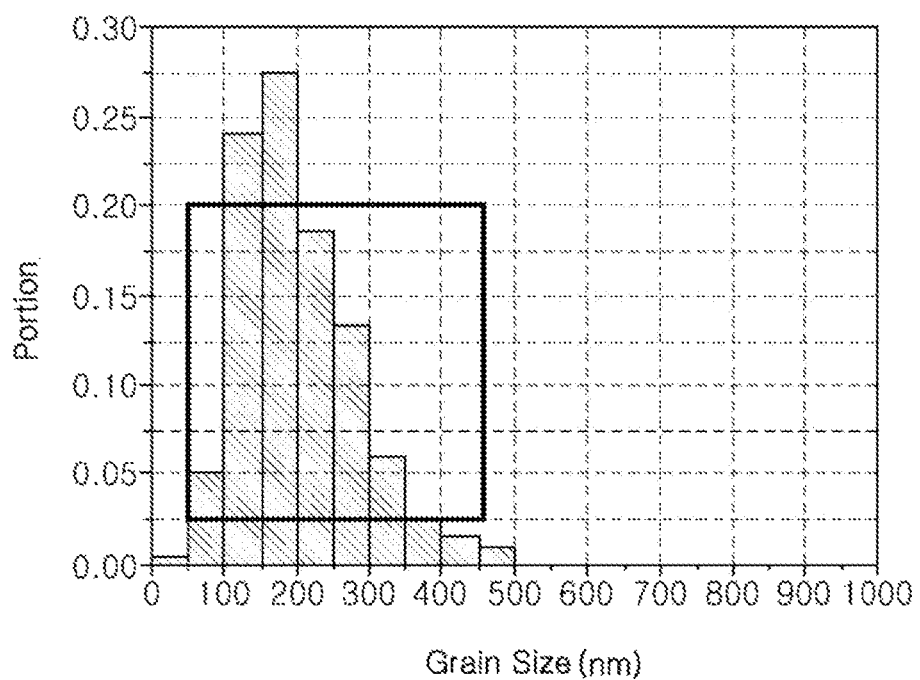
Figure 3G:
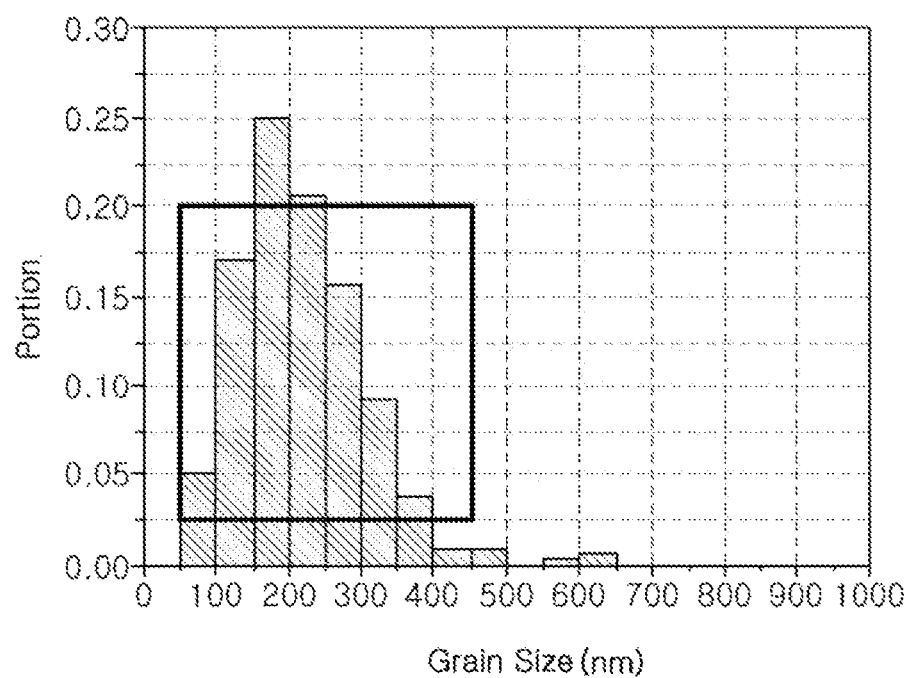
Figure 3H:
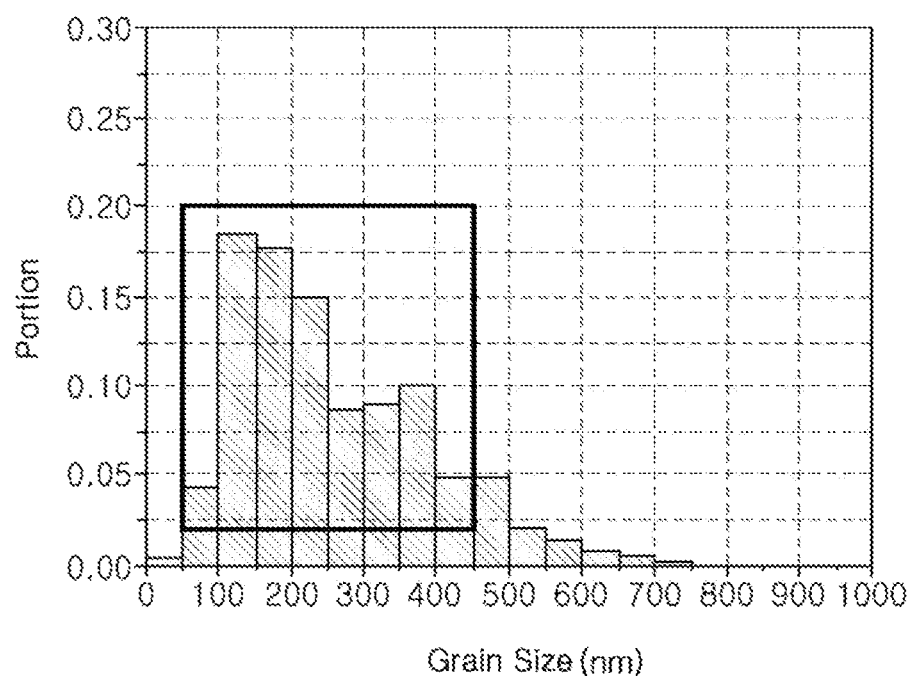
Figure 3I:
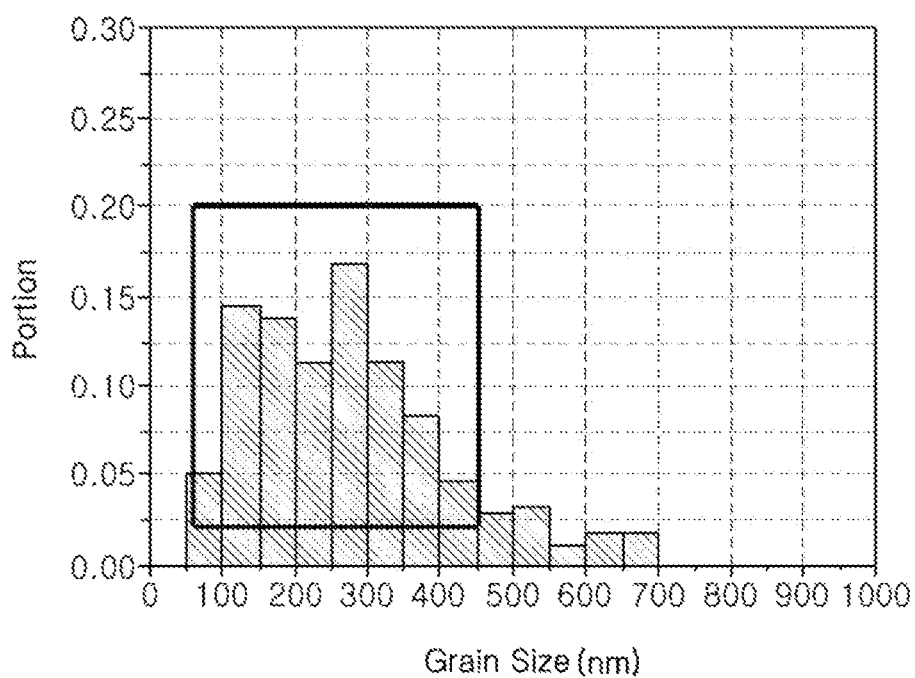
Figure 3J:
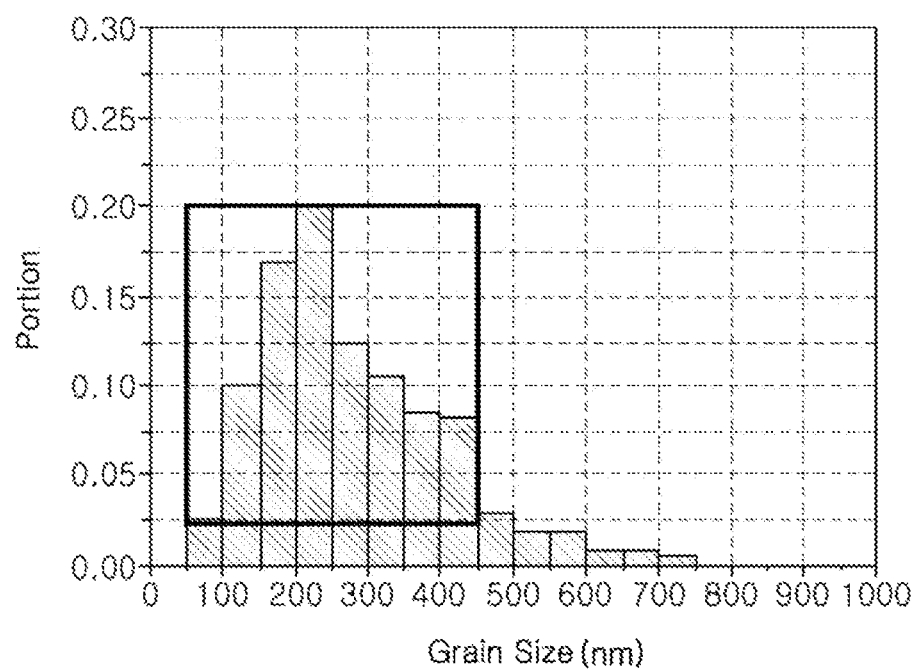
Figure 3K:
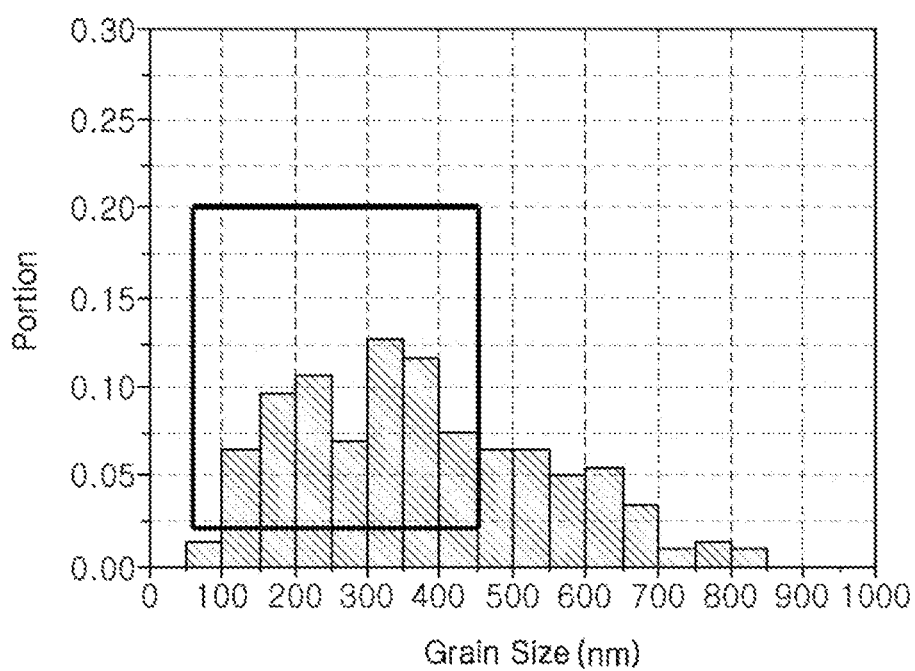
Figure 3L:
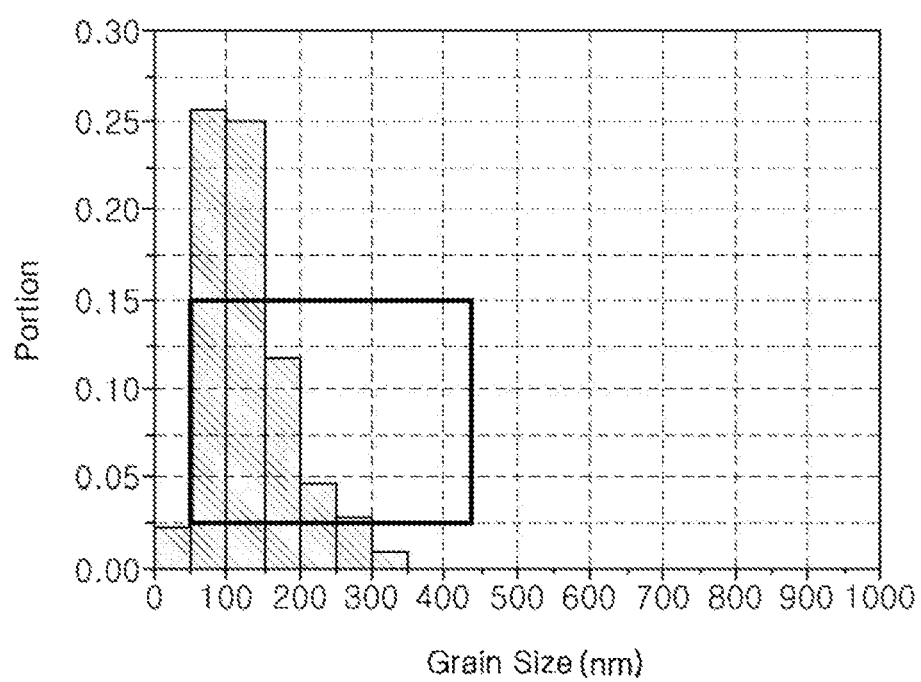
Figure 3M:
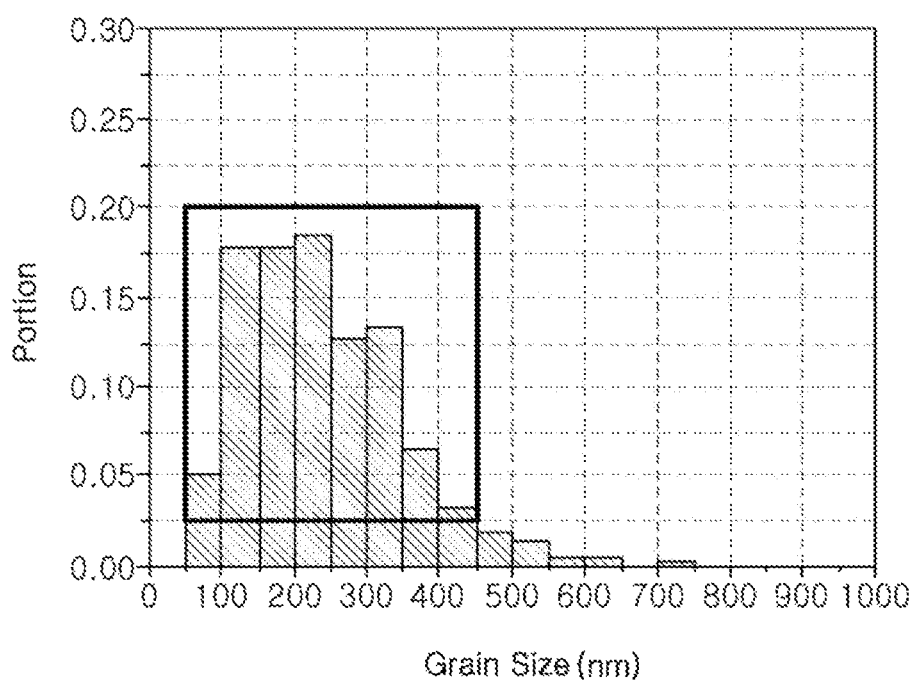
Figure 3N:
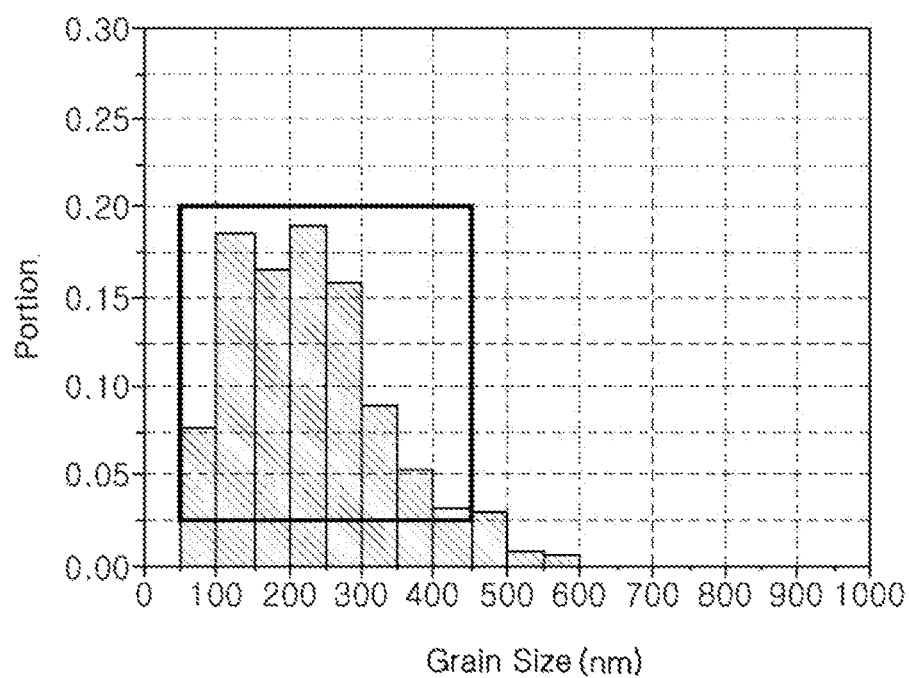
Figure 3O:
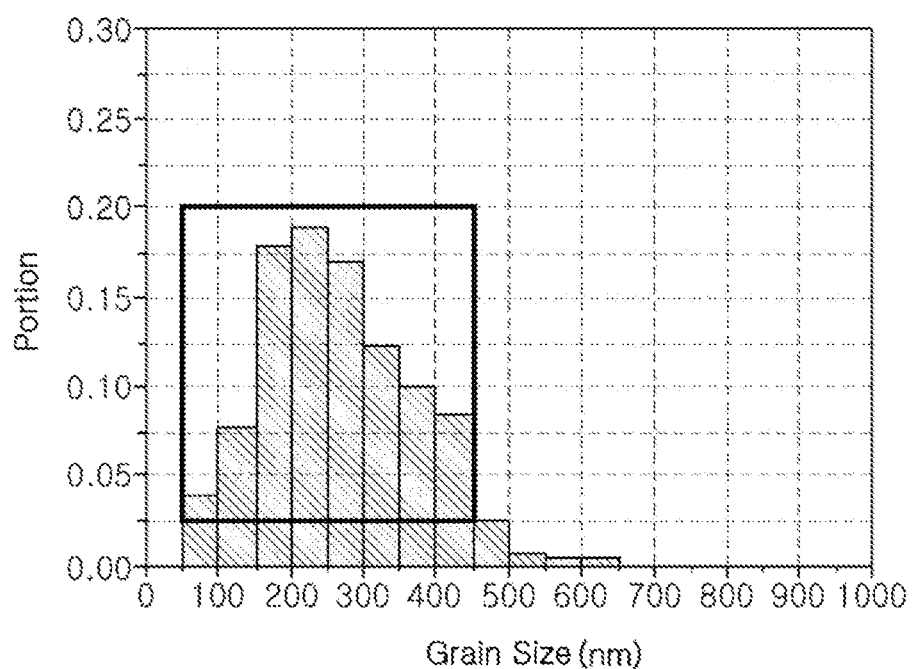
Figure 3P:
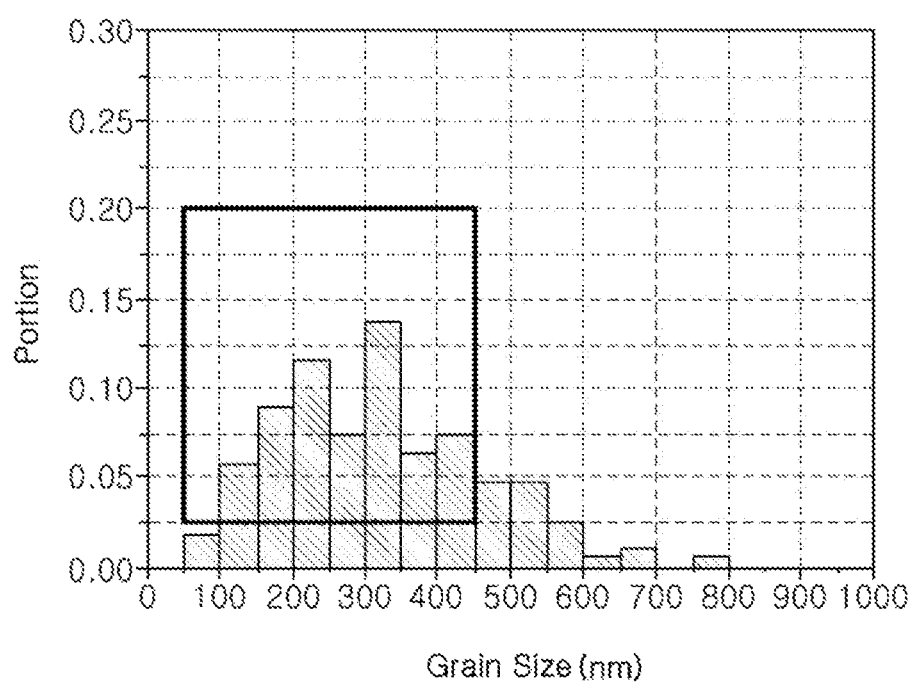
Figure 3Q:
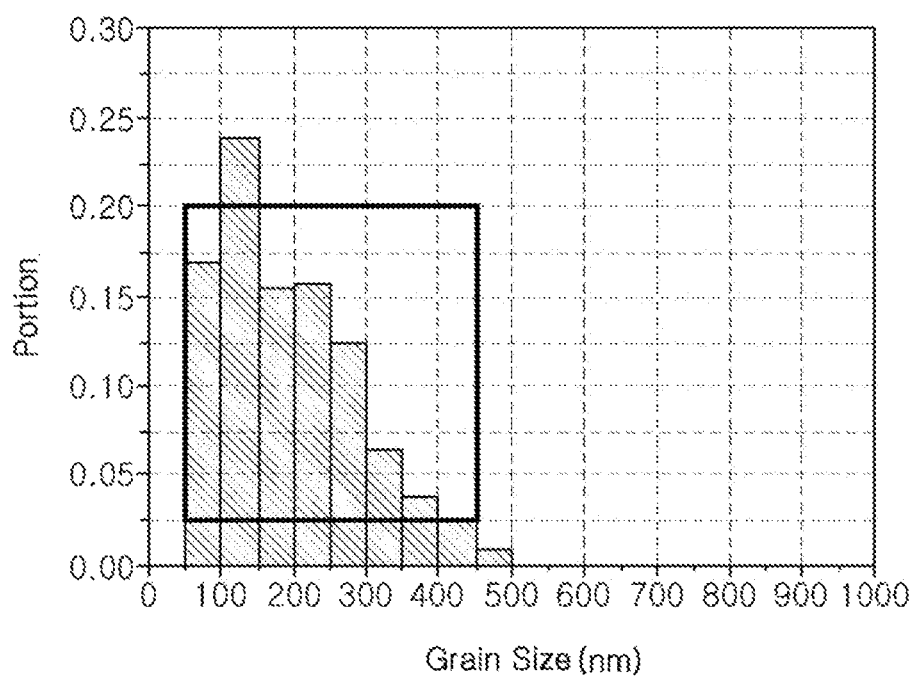
Figure 3R:
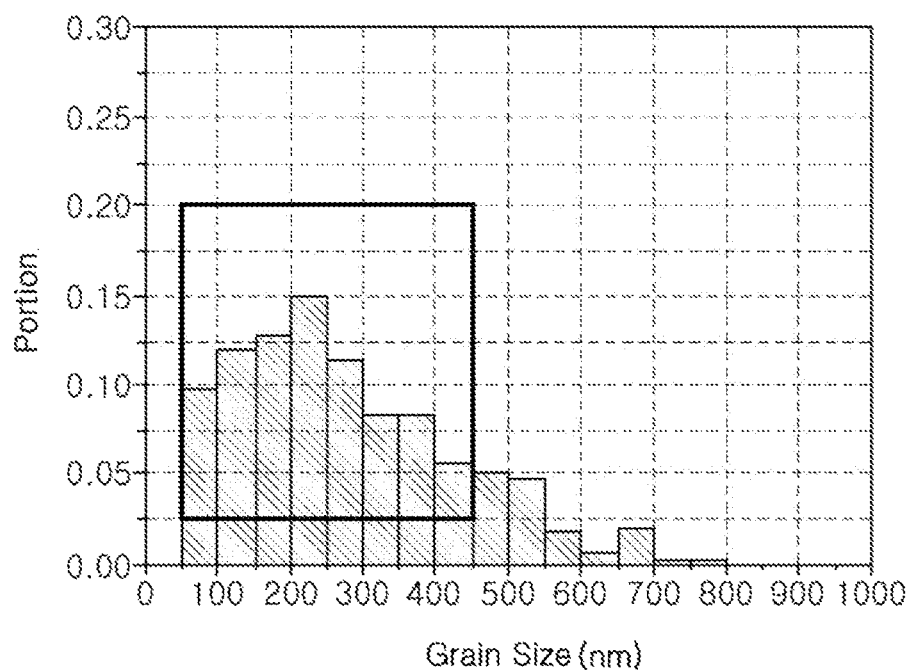
Figure 3S:
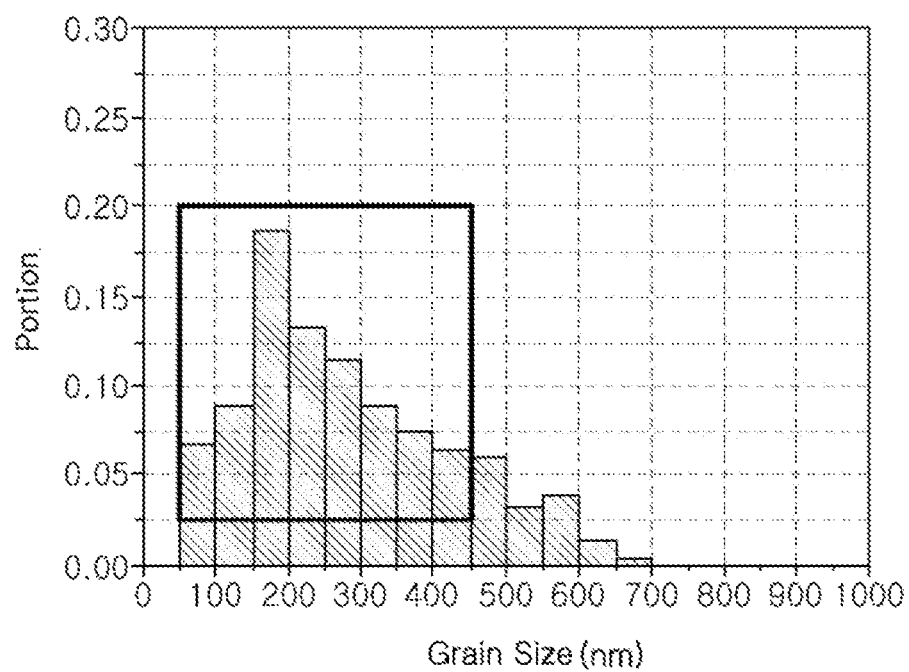
Figure 3T:
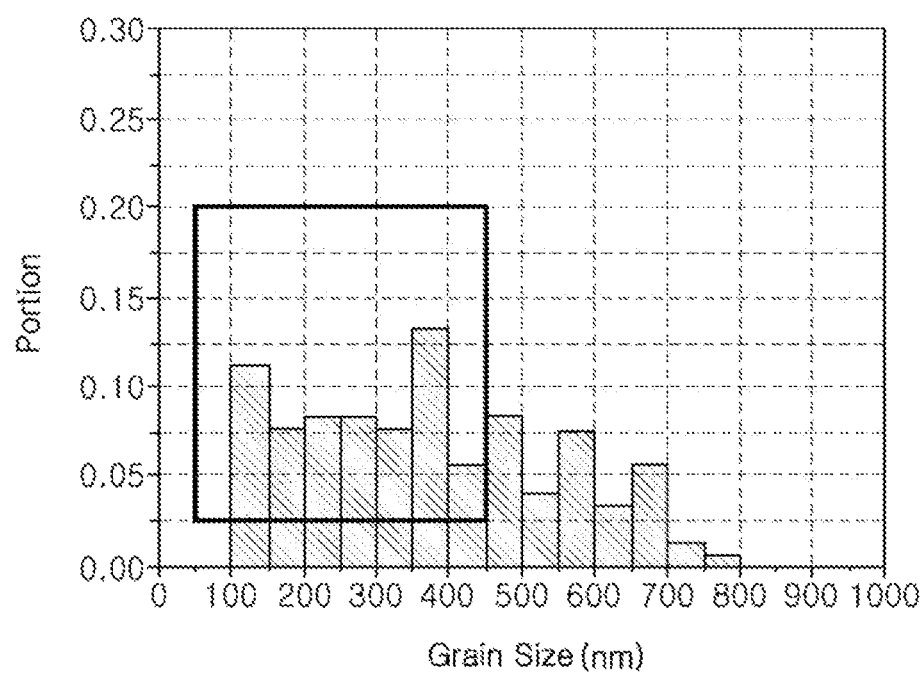
Figure 3U:
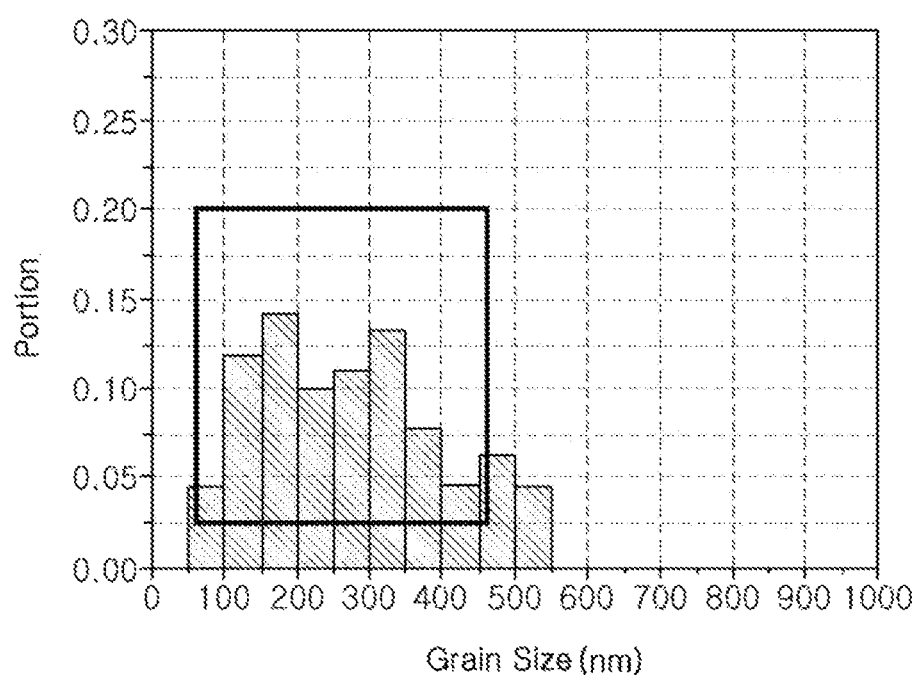
Figure 3V:
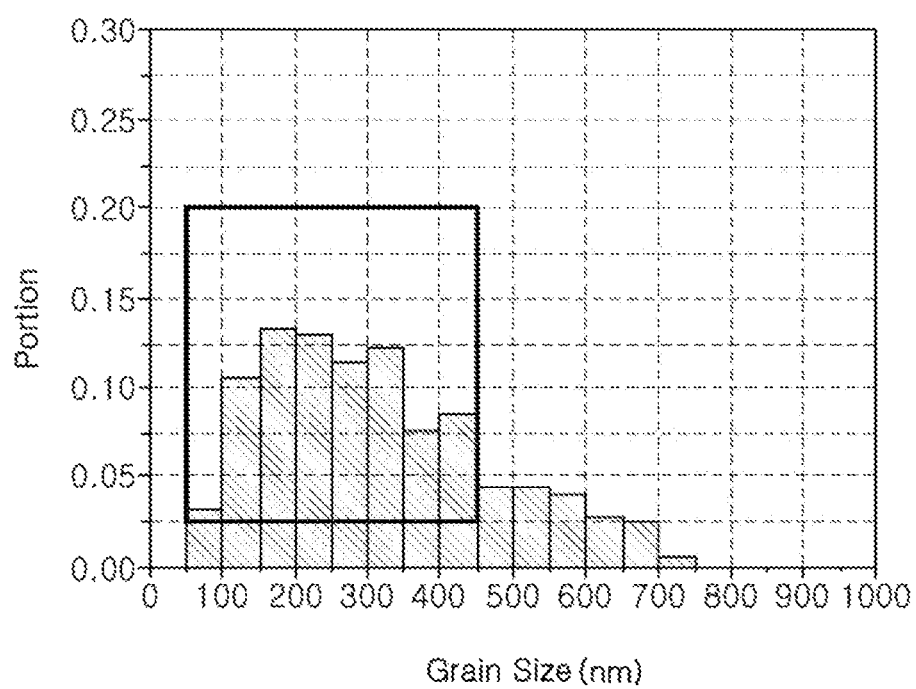
Figure 3W:
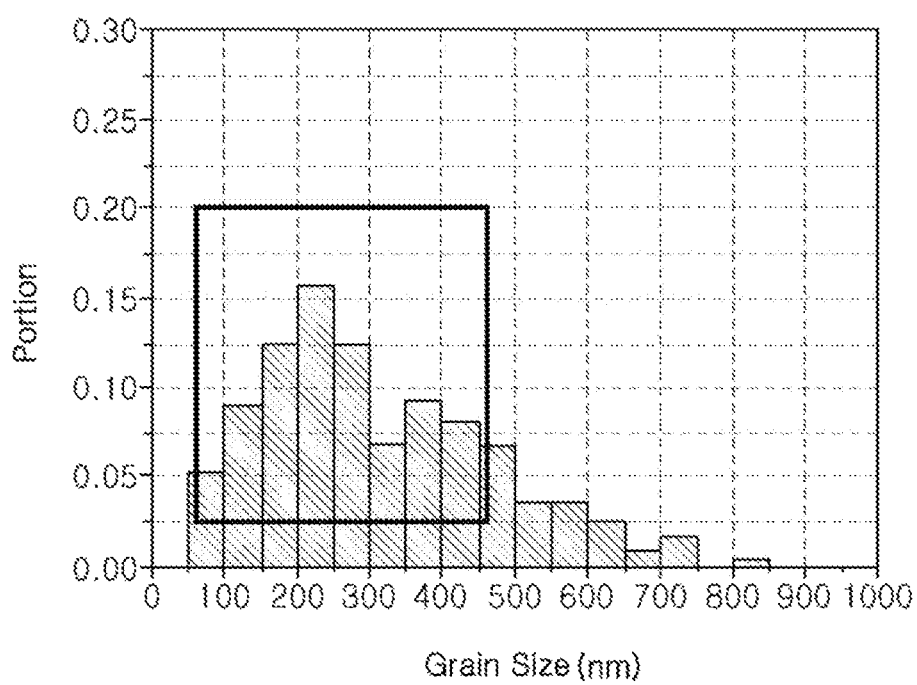
Figure 3X:
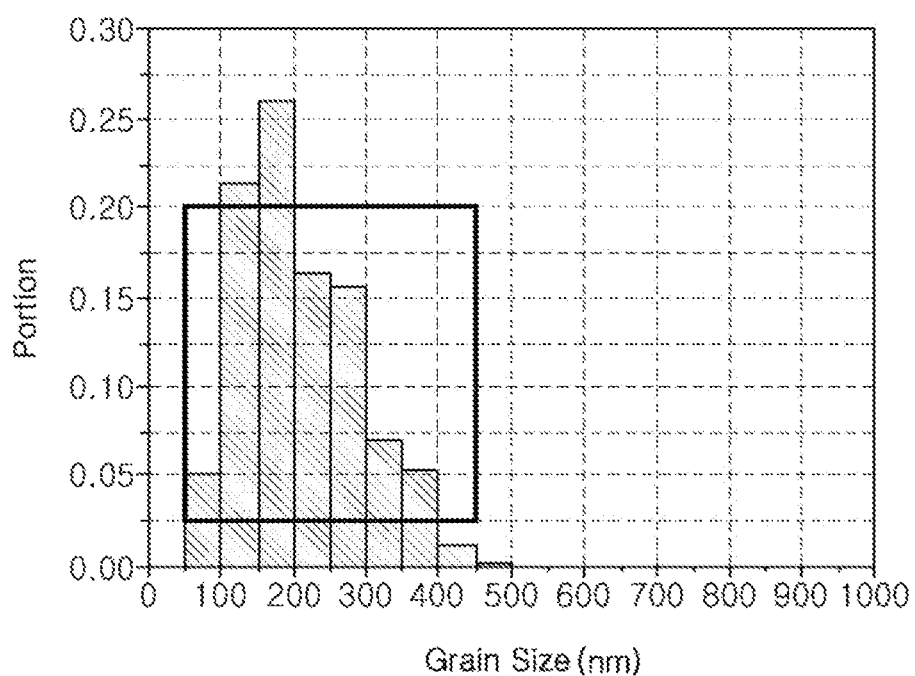

FIGS. 3A through 3X are graphs illustrating dielectric grain size distribution according to Inventive Examples and Comparative Examples.

Experimental Example

As a base material main ingredient, a $BaTiO_3$ powder having an average particle size of 40 to 120 nm was used.

Raw material powders containing main ingredients and accessory ingredients corresponding to compositions 1 to 4 illustrated in Table 1 were mixed with a dispersant and a binder in ethanol/toluene using zirconia balls as mixing/dispersing media and then ball-milled for 20 hours.

Forming sheets having thicknesses of 0.8 μm and 10 μm were manufactured from the prepared slurry using a sheet forming machine for manufacturing a thin sheet. A nickel (Ni) internal electrode was printed on the forming sheet.

Upper and lower covers were manufactured by stacking 25 cover sheets (thickness: 10 to 13 μm), and 21 active sheets on which the Ni internal electrode was printed were stacked while being compressed, thereby manufacturing a compressed bar.

The compressed bar was cut into chips having a 3216 size (3.2 mm×1.6 mm) using a cutter.

After the manufactured chip having the 3216 size was calcined and sintered at 1080 to 1120° C. for 10 minutes to 1 hour under a reduction atmosphere (0.1% $H_2$/99.9% $N_2$ to 1.0% $H_2$/99.0% $N_2$, $H_2O/H_2/N_2$ atmosphere), the sintered chip was heat-treated by performing re-oxidation at 1000° C. for 3 hours under a nitrogen ($N_2$) atmosphere.

External electrodes were completed by terminating the sintered chip using a copper (Cu) paste and sintering the formed electrodes.

Therefore, a multilayer ceramic capacitor (MLCC) in which a thickness of the dielectric layer after sintering was about 0.6 μm and the number of dielectric layers was 20, and of which a size was 3.2 mm×1.6 mm was manufactured.

Samples in which grain size distribution was various as illustrated in Experimental Examples of [Table 2] and FIGS. 3A through 3X were manufactured by suitably adjusting a size of a starting base material powder, accessory ingredient composition, a sintering temperature, a sintering maintenance time, and a sintering atmosphere.

The room-temperature capacitance and dissipation factor of the multilayer ceramic capacitor (MLCC) chip were measured at 1 kHz and AC voltage of 0.5 V/μm using a LCR-meter.

Permittivity of the multilayer ceramic capacitor (MLCC) was calculated from the capacitance, a thickness of a dielectric layer, an area of the internal electrodes, and the number of stacked dielectric layers of the multilayer ceramic capacitor (MLCC).

Room temperature insulation resistance (IR) was measured after 60 seconds in a state in which ten samples each were taken and a DC voltage of 10 V/μm was applied thereto.

The temperature coefficient of capacitance (TCC) was measured in a temperature range from −55 to 145° C.

Ina high-temperature IR boosting test, a resistance degradation behavior was measured while increasing the respective step voltages by 10 V/μm at 150° C., and a resistance value was measured every 5 seconds, wherein the time of the respective step was 10 minutes.

The high-temperature withstand voltage was derived from the high-temperature IR boosting test. Here, the high-temperature withstand voltage is defined as a voltage at which an IR may withstand $10^6 \Omega$ or more when the high-temperature withstand voltage was measured by applying a step voltage of DC 5 V/μm to a 3216 size chip at 150° C. for 10 minutes and continuously increasing the step voltage, wherein the 3216 size chip has 20 dielectric layers having a thickness of 0.6 μm after sintering.

A RC value is a product of a room-temperature capacitance value measured at AC 0.5 V/μm and 1 kHz and an insulation resistance value measured at DC 10 V/μm.

The following [Table 3] illustrates characteristics of the proto-type chips corresponding to Inventive Examples illustrated in [Table 2].

A grain size was observed using a scanning electron microscope (SEM) image. Grain size distribution described in Experimental Examples was calculated by measuring lengths of respective long axes and short axes 200 grains per one sample.

TABLE 1

Content (mole) of Each Additive Based on 100 Moles of Base Material (BaTiO$_3$)

| Accessory Ingredient Composition | 1st Accessary Ingredient MnO$_2$ | | 2nd Acessary Ingredient V$_2$O$_5$ | 3rd Accessory Ingredient MgCO$_3$ | 4th Accessory Ingredient Dy$_2$O$_3$ | 5th Accessory Ingredient BaCO$_3$ | | Ca | Zr | 8th Accessory Ingredient Al$_2$O$_3$ | SiO$_2$ |
|---|---|---|---|---|---|---|---|---|---|---|---|
| Composition 1 | 0.200 | | 0.100 | 0.00 | 0.50 | 1.00 | | 0 | 0 | 0.20 | 1.25 |
| Composition 2 | 0.200 | | 0.100 | 1.00 | 1.00 | 0.60 | | 1.00 | 1.00 | 0.20 | 1.25 |
| Composition 3 | 0.200 | | 0.300 | 0.00 | 0.50 | 1.00 | | 1.00 | 1.00 | 0.20 | 1.25 |
| Composition 4 | 0.200 | | 0.100 | 1.00 | 1.00 | 1.80 | | 3.00 | 3.00 | 0.20 | 2.50 |

TABLE 2

| Experimental Example | Particle Size of Main Ingredient Powder | Kind of Accessory Ingredient Additive | Grain Size Fraction in 50 to 540 nm | | | | | | | | Is Grain Size Distribution Satisfied? |
|---|---|---|---|---|---|---|---|---|---|---|---|
| | | | 50~100 nm | 100~150 nm | 150~200 nm | 200~250 nm | 250~300 nm | 300~350 nm | 350~400 nm | 400~450 nm | |
| 1 | 50 | Composition 1 | 17.0% | 27.0% | 23.0% | 13.0% | 11.0% | 3.0% | 2.0% | 1.8% | X |
| 2 | | | 8.0% | 18.0% | 16.5% | 13.0% | 16.0% | 7.6% | 8.7% | 4.8% | ○ |
| 3 | | | 5.5% | 8.7% | 11.4% | 14.9% | 13.0% | 13.0% | 9.0% | 9.5% | ○ |
| 4 | | | 5.5% | 12.6% | 10.5% | 13.0% | 6.0% | 8.0% | 7.5% | 7.0% | ○ |
| 5 | | | 0.0% | 7.0% | 13.5% | 7.4% | 8.0% | 8.0% | 11.5% | 9.0% | X |
| 6 | | Composition 2 | 5.0% | 24.0% | 27.5% | 18.0% | 13.0% | 5.2% | 2.8% | 1.3% | X |
| 7 | | | 5.1% | 17.0% | 25.0% | 21.0% | 16.0% | 9.5% | 3.7% | 1.0% | X |
| 8 | | | 4.8% | 18.0% | 17.7% | 15.0% | 8.7% | 9.0% | 10.0% | 5.0% | ○ |
| 9 | | | 5.2% | 15.0% | 14.0% | 11.5% | 17.0% | 11.8% | 8.2% | 5.0% | ○ |
| 10 | | | 2.5% | 10.5% | 17.0% | 20.0% | 12.5% | 11.0% | 87.0% | 8.0% | ○ |
| 11 | | | 1.2% | 7.3% | 10.0% | 11.0% | 7.4% | 12.6% | 12.0% | 7.6% | X |
| 12 | | Composition 3 | 34.0% | 33.0% | 16.0% | 7.0% | 4.0% | 1.3% | 0.2% | 0.2% | X |
| 13 | | | 5.0% | 17.7% | 17.7% | 18.0% | 12.6% | 13.5% | 7.0% | 2.7% | ○ |
| 14 | | | 7.5% | 18.0% | 17.0% | 18.5% | 16.0% | 3.0% | 5.5% | 2.6% | ○ |
| 15 | | | 3.2% | 7.5% | 18.0% | 19.0% | 17.4% | 12.5% | 9.9% | 8.0% | ○ |
| 16 | | | 1.3% | 5.5% | 8.3% | 12.0% | 7.5% | 13.0% | 6.3% | 7.5% | X |
| 17 | | Composition 4 | 17.0% | 23.0% | 15.1 | 15.3 | 12.6% | 7.0% | 3.0% | 2.5% | X |
| 18 | | | 10.0% | 12.4% | 12.6% | 15.0% | 12.0% | 8.0% | 8.0% | 6.0% | ○ |
| 19 | | | 7.2% | 8.7% | 18.0% | 13.0% | 12.0% | 8.7% | 7.5% | 7.0% | ○ |
| 20 | | | 0.0% | 11.3% | 7.6% | 8.0% | 8.0% | 7.6% | 13.0% | 6.2% | X |
| 21 | 40 | Composition 1 | 4.9% | 12.0% | 14.0% | 10.0% | 11.0% | 13.0% | 7.6% | 4.9% | ○ |
| 22 | 80 | Composition 1 | 2.6% | 11.0% | 13.0% | 12.8% | 12.0% | 12.5% | 7.6% | 8.0% | ○ |
| 23 | 120 | Composition 1 | 5.1% | 8.8% | 12.5% | 15.7% | 12.5% | 7.0% | 9.5% | 8.0% | ○ |
| 24 | 180 | Composition 1 | 5.2% | 20.5% | 11.5 | 24.7% | 15.0% | 14.5% | 7.4% | 1.2% | X |

TABLE 3

Characteristics of Proto-type Chip AC 0.5 V/um, 1 KHz

| Comparative Example | Permittivity | DF(%) | RC(ΩF) | TCC(%) (85° C.) | Permittivity @ dc2 V/μm | High-Temperature Withstand Voltage (V/μm)* | ○: Good X: Poor |
|---|---|---|---|---|---|---|---|
| 1 | 2639 | 4.50 | 2345 | −8.4% | 2215 | 75 | X |
| 2 | 3368 | 5.80 | 2560 | −9.5% | 2602 | 75 | ○ |
| 3 | 3904 | 6.70 | 2465 | −13.2% | 2675 | 70 | ○ |
| 4 | 4122 | 7.20 | 1852 | −14.5% | 2832 | 60 | ○ |
| 5 | 4320 | 7.40 | 1545 | −15.8% | 2756 | 45 | X |
| 6 | 3003 | 4.80 | 2745 | −10.0% | 2345 | 80 | X |
| 7 | 3152 | 5.20 | 3007 | −8.5% | 2230 | 80 | X |
| 8 | 3772 | 6.30 | 2510 | −12.9% | 2703 | 80 | ○ |
| 9 | 4134 | 7.40 | 1933 | −14.7% | 2915 | 75 | ○ |
| 10 | 4257 | 7.50 | 1846 | −14.9% | 2836 | 65 | ○ |
| 11 | 4526 | 8.60 | 1765 | −15.6% | 2642 | 55 | X |
| 12 | 2980 | 4.50 | 2236 | −8.4% | 2304 | 70 | X |
| 13 | 3550 | 5.60 | 2300 | −12.2% | 2620 | 70 | ○ |
| 14 | 3670 | 6.40 | 2345 | −12.7% | 2660 | 75 | ○ |

TABLE 3-continued

Characteristics of Proto-type Chip AC 0.5 V/um, 1 KHz

| Comparative Example | Permittivity | DF(%) | RC(ΩF) | TCC(%) (85° C.) | Permittivity @ dc2 V/μm | High-Temperature Withstand Voltage (V/μm)* | ○: Good X: Poor |
|---|---|---|---|---|---|---|---|
| 15 | 4046 | 7.20 | 2094 | −13.5% | 2756 | 75 | ○ |
| 16 | 4750 | 8.50 | 1630 | −16.2% | 2540 | 55 | X |
| 17 | 2398 | 3.90 | 2665 | −7.5% | 2060 | 70 | X |
| 18 | 3510 | 6.25 | 3020 | −10.0% | 2650 | 65 | ○ |
| 19 | 3798 | 6.40 | 2845 | −12.5% | 2720 | 60 | ○ |
| 20 | 4441 | 8.50 | 2003 | −16.5% | 2625 | 45 | X |
| 21 | 3790 | 6.50 | 2474 | −13.1% | 2723 | 80 | ○ |
| 22 | 3783 | 6.70 | 2352 | −13.5% | 2703 | 75 | ○ |
| 23 | 3461 | 5.50 | 1840 | −10.5% | 2625 | 60 | ○ |
| 24 | 2980 | 4.50 | 2345 | −10.5 | 2525 | 45 | X |

Experimental Examples 1 to 5 in [Table 2] indicate Experimental Examples in which a $BaTiO_3$ base material having a particle size of 50 nm was used as the main ingredient, additive composition 1 of Table 1 was used as the accessory ingredient composition, and grain size distribution was different from each other by changing the sintering maintenance time, and Table 3 illustrates characteristics of the proto-type MLCC samples corresponding to these Experimental Examples 1 to 5.

FIGS. 3A through 3E are graphs illustrating grain size distribution of the samples in Experimental Examples 1 to 5. In a case in which a grain size was excessively small and uniform as in Comparative Example 1, there was a problem in that nominal permittivity was excessively small (less than 3300).

Meanwhile, in a case in which a grain size was excessively large and was excessively widely distributed as in Comparative Example 5, there was a problem in that nominal permittivity was high (4300 or more), but high-temperature (85° C.) TCC of ±15% was not satisfied, and high-temperature (150° C.) withstand voltage was decreased to be less than 60 V/μm.

In a case in which small grains and large grains co-existed in a suitable range in the grain size distribution as in Inventive Examples 2 to 4, all the desired characteristics of the present disclosure, that is, nominal permittivity of 3300 or more, DC-bias permittivity @2V/μm (permittivity at the time of applying DC voltage of 2 V/μm) of 2600 or more, high-temperature (150° C.) withstand voltage of 60 V/μm or more, and TCC (85° C.) of less than ±15%, may be simultaneously implemented.

That is, describing the grain size distribution of the samples in which these characteristics were implemented in detail, the thickness of the dielectric layer may be 0.80 μm or less, and when the grain sizes were divided into sections with an interval of 50 nm, a grain size fraction in each of the sections in a range of 50 nm to 450 nm may be in a range of 0.025 to 0.20.

Experimental Examples 6 to 11 in [Table 2] indicate Experimental Examples in which a $BaTiO_3$ base material having a particle size of 50 nm was used as the main ingredient, additive composition 2 was used as the accessory ingredient composition, and grain size distribution was different from each other by changing the sintering maintenance time, and Table 3 illustrates characteristics of the proto-type MLCC samples corresponding to these Experimental Examples 6 to 11.

FIGS. 3F through 3K are graphs illustrating grain size distribution of the samples in Experimental Examples 6 to 11. In these cases, the same tendency as that in Experimental Examples 1 to 5 to which Composition 1 was used may be confirmed. In a case in which a grain size was excessively small and uniform as in Comparative Examples 6 and 7, there was a problem in that nominal permittivity was excessively small (less than 3300).

Meanwhile, in a case in which a grain size was excessively large and was excessively widely distributed as in Comparative Example 11, it may be confirmed that nominal permittivity was high (4300 or more), but high-temperature (85° C.) TCC of ±15% was not satisfied, high-temperature (150° C.) withstand voltage was decreased to be less than 60 V/μm, and DC bias permittivity @2V/μm was also decreased.

On the contrary, when the grain sizes were divided into sections with an interval of 50 nm, in a case in which a grain size fraction in each of the sections in a range of 50 nm to 450 nm was in a range of 0.025 to 0.20 as in Inventive Examples 8 to 10, it may be appreciated that all the desired characteristics of the present disclosure, that is, nominal permittivity of 3300 or more, DC-bias permittivity @2V/μm (permittivity at the time of applying DC voltage of 2 V/μm) of 2600 or more, high-temperature (150° C.) withstand voltage of 60 V/μm or more, and TCC (85° C.) of less than ±15%, may be simultaneously implemented.

Experimental Examples 12 to 16 in [Table 2] indicate Experimental Examples in which a $BaTiO_3$ base material having a particle size of 50 nm was used as the main ingredient, additive composition 3 of Table 1 was used as the accessory ingredient composition, and grain size distribution was different from each other by changing the sintering maintenance time, and Table 3 illustrates characteristics of the proto-type MLCC samples corresponding to these Experimental Examples 12 to 16.

FIGS. 3L through 3P are graphs illustrating grain size distribution of the samples in Experimental Examples 12 to 16.

In these cases, the same tendency as those in Experimental Examples 1 to 5 to which Composition 1 was used and Experimental Examples 6 to 11 in which Composition 2 was used may be confirmed.

Ina case in which a grain size was excessively small and uniform as in Comparative Example 12, there was a problem in that nominal permittivity was excessively small (less than 3300). Meanwhile, in a case in which a grain size was excessively large and was excessively widely distributed as in Comparative Example 16, it may be confirmed that nominal permittivity was high (4300 or more), but high-temperature (85° C.) TCC of ±15% was not satisfied, high-temperature (150° C.) withstand voltage was decreased to be less than 60 V/μm, and DC bias permittivity @2V/μm was also decreased to be less than 2600.

On the contrary, when the grain sizes were divided into sections with an interval of 50 nm, in a case in which a grain size fraction in each of the sections in a range of 50 nm to 450 nm was in a range of 0.025 to 0.20 as in Inventive Examples 13 to 15, it may be appreciated that all the desired characteristics of the present disclosure, that is, nominal permittivity of 3300 or more, DC-bias permittivity @2V/μm (permittivity at the time of applying DC voltage of 2 V/μm) of 2600 or more, high-temperature (150° C.) withstand voltage of 60 V/μm or more, and TCC (85° C.) less than ±15%, may be simultaneously implemented.

Experimental Examples 17 to 20 in [Table 2] indicate Experimental Examples in which a $BaTiO_3$ base material having a particle size of 50 nm was used as the main ingredient, additive composition 4 of Table 1 was used as the accessory ingredient composition, and grain size distribution was different from each other by changing the sintering maintenance time, and Table 3 illustrates characteristics of the proto-type MLCC samples corresponding to these Experimental Examples 17 to 20.

FIGS. 3Q through 3T are graphs illustrating grain size distribution of the samples in Experimental Examples 17 to 20.

In these cases, the same tendency as those in Experimental Examples 1 to 5 to which Composition 1 was used, Experimental Examples 6 to 11 in which Composition 2 was used, and Experimental Examples 12 to 16 in which Composition 3 was used may be confirmed.

Ina case in which a grain size was excessively small and uniform as in Comparative Example 17, there was a problem in that nominal permittivity was excessively small (less than 3300). Meanwhile, in a case in which a grain size was excessively large and was excessively widely distributed as in Comparative Example 20, it may be confirmed that nominal permittivity was high (4300 or more), but high-temperature (85° C.) TCC of ±15% was not satisfied, and high-temperature (150° C.) withstand voltage was decreased to be less than 60 V/μm.

On the contrary, when the grain sizes were divided into sections with an interval of 50 nm, in a case in which a grain size fraction in each of the sections in a range of 50 nm to 450 nm was in a range of 0.025 to 0.20 as in Inventive Examples 18 and 19, it may be appreciated that all the desired characteristics of the present disclosure, that is, nominal permittivity of 3300 or more, DC-bias permittivity @2V/μm (permittivity at the time of applying DC voltage of 2 V/μm) of 2600 or more, high-temperature (150° C.) withstand voltage of 60 V/μm or more, and TCC (85° C.) of less than ±15%, may be simultaneously implemented.

Experimental Examples 21 to 24 in [Table 2] indicate Experimental Examples in which additive composition 1 of Table 1 was used as the accessory ingredient composition, $BaTiO_3$ base material powders having particle size of 40 nm, 80 nm, 120 nm, and 180 nm, respectively, were each used as the main ingredient, and grain size distribution was different from each other by suitably adjusting the sintering maintenance time, and Table 3 illustrates characteristics of the proto-type MLCC samples corresponding to these Experimental Examples 21 to 24.

FIGS. 3U through 3X are graphs illustrating grain size distribution of the samples in Experimental Examples 21 to 24.

In Examples 21 to 23, that when the grain sizes were divided into sections with an interval of 50 nm, a grain size fraction in each of the sections in a range of 50 nm to 450 nm was in a range of 0.025 to 0.20, and it may be confirmed all the desired characteristics of the present disclosure were implemented.

On the contrary, in Comparative Example 24 in which the additive composition 1 was used and the $BaTiO_3$ base material powder having a particle size of 180 nm was used as the main ingredient, even in a case of increasing the sintering maintenance time as long as possible, it may be appreciated that it was impossible to manufacture a sample of which the grain size fraction in each of the sections in a range of 50 nm to 450 nm was in a range of 0.025 to 0.20, and thus, the desired characteristics of the present disclosure were not implemented.

Therefore, it may be appreciated that in order to implement the grain size distribution suggested in the present disclosure and the desired characteristics of the present disclosure, the $BaTiO_3$ main ingredient base material needs to have a particle size of 120 nm or less.

As set forth above, according to exemplary embodiments in the present disclosure, the microstructure in which grain sizes in one dielectric layer are various may be implemented, such that the dielectric ceramic composition capable of satisfying the X5R or X7R characteristics of EIA standards, that is, high capacitance and relatively high effective capacitance in an environment in which DC-bias is applied, and the multilayer ceramic capacitor containing the same may be implemented.

More specifically, according to the exemplary embodiments in the present disclosure, all the desired characteristics, that is, capability of being sintered under a reduction atmosphere at which the nickel (Ni) internal electrode may be applied, the dielectric layer having a thickness of 0.8 μm or less, high nominal permittivity, specifically, permittivity of 3300 or more, high effective permittivity, specifically, DC-bias permittivity (permittivity at the time of applying DC voltage of 2 V/μm) of 2600 or more, high-temperature (150° C.) withstand voltage of 60 V/μm or more, and temperature coefficient of capacitance (TCC) (at 85° C.) of less than ±15%, may be simultaneously implemented.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body in which dielectric layers and first and second internal electrodes are alternately stacked; and
   first and second external electrodes disposed on an outer surface of the ceramic body and electrically connected to the first and second internal electrodes, respectively,
   wherein when, in a microstructure of the dielectric layer, dielectric grains, each having a grain size in a range of 50 nm to 450 nm, inclusive, are divided into respective sequential sections each having a range of 50 nm, a fraction of the dielectric grains in each of the sections is within a range of 0.025 to 0.20.

2. The multilayer ceramic capacitor of claim 1, wherein the dielectric layer is formed of a dielectric ceramic composition containing a barium titanate based base material main ingredient and an accessory ingredient, the accessory ingredient including:
a first accessory ingredient containing one or more selected from the group consisting of oxides and carbonates of one or more variable-valence acceptor elements among Mn, V, Cr, Fe, Ni, Co, Cu, and Zn;
a second accessory ingredient containing one or more of oxides and carbonates of fixed-valence acceptor elements including Mg;
a third accessory ingredient containing one or more selected from the group consisting of oxides and carbonates of one or more elements among Y, Dy, Ho, Sm, Gd, Er, La, Ce, Tb, Tm, Yb, and Nd;
a fourth accessory ingredient containing one or more selected from the group consisting of oxides and carbonates of Ba;
a fifth accessory ingredient containing one or more selected from the group consisting of oxides and carbonates of Ca and Zr; and
a sixth accessory ingredient containing one or more selected from the group consisting of oxides or carbonates of Si and Al, and glass containing Si.

3. The multilayer ceramic capacitor of claim 2, wherein the accessory ingredient includes the first accessory ingredient containing one or more selected from the group consisting of the oxides and the carbonates of one or more variable-valence acceptor elements among Mn, V, Cr, Fe, Ni, Co, Cu, and Zn, and
a sum of contents of one or more variable-valence acceptor elements among Mn, V, Cr, Fe, Ni, Co, Cu, and Zn contained in the first accessory ingredient is within a range from 0.1 to 2.0 parts by mole, based on 100 parts by mole of the base material main ingredient.

4. The multilayer ceramic capacitor of claim 2, wherein the accessory ingredient includes the second accessory ingredient containing one or more of the oxides and carbonates of the fixed-valence acceptor elements including Mg, and
a content of the fixed-valence acceptor elements including Mg contained in the second accessory ingredient is 2.0 parts by mole or less, based on 100 parts by mole of the base material main ingredient.

5. The multilayer ceramic capacitor of claim 2, wherein the accessory ingredient includes the third accessory ingredient containing one or more selected from the group consisting of the oxides and the carbonates of one or more elements among Y, Dy, Ho, Sm, Gd, Er, La, Ce, Tb, Tm, Yb, and Nd, and
a sum of contents of one or more elements among Y, Dy, Ho, Sm, Gd, Er, La, Ce, Tb, Tm, Yb, and Nd contained in the third accessory ingredient is 4.0 parts by mole or less, based on 100 parts by mole of the base material main ingredient.

6. The multilayer ceramic capacitor of claim 2, wherein the accessory ingredient includes the fourth accessory ingredient containing one or more selected from the group consisting of the oxides and carbonates of Ba, and
a content of Ba contained in the fourth accessory ingredient is 4.0 parts by mole or less, based on 100 parts by mole of the base material main ingredient.

7. The multilayer ceramic capacitor of claim 2, wherein the accessory ingredient includes the fifth accessory ingredient containing one or more selected from the group consisting of the oxides and carbonates of Ca and Zr, and
a content (based on Ca and Zr) of one or more elements among Ca and Zr contained in the fifth accessory ingredient is 10 parts by mole or less, based on 100 parts by mole of the base material main ingredient.

8. The multilayer ceramic capacitor of claim 2, wherein the accessory ingredient includes the sixth accessory ingredient containing one or more selected from the group consisting of the oxides or carbonates of Si and Al, and the glass containing Si, and
a content of one or more elements among Si and Al contained in the sixth accessory ingredient is 4.0 parts by mole or less, based on 100 parts by mole of the base material main ingredient.

9. The multilayer ceramic capacitor of claim 2, wherein the base material main ingredient has a particle size of 120 nm or less.

10. The multilayer ceramic capacitor of claim 2, wherein the base material main ingredient contains one or more selected form the group consisting of $BaTiO_3$, and $(Ba_{1-x}Ca_x)(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, or the like, is partially solid-dissolved.

* * * * *